United States Patent Office 3,014,948
Patented Dec. 26, 1961

3,014,948
CYCLIC ESTERS OF PHOSPHORUS COMPOUNDS
Gail H. Birum, Dayton, Ohio, assignor to Monsanto Chemical Company, St. Louis, Mo., a corporation of Delaware
No Drawing. Filed Dec. 7, 1960, Ser. No. 74,228
18 Claims. (Cl. 260—461)

The present invention relates to organic compounds of phosphorus and more particularly provides new and valuable cyclic phosphites of certain hydroxy phosphonic or phosphinic acids and the method of preparing the same.

According to the invention, the new phosphite-phosphonates or phosphite-phosphinates are prepared by the reaction of certain halogen-containing ring compounds of phosphorus with certain esters of trivalent phosphorus acids and certain carbonyl compounds, substantially according to the scheme:

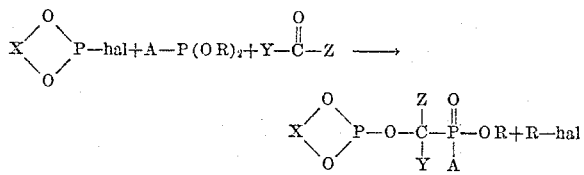

in which X is selected from the class consisting of bivalent alkylene and arylene radicals of from 2 to 6 carbon atoms and said radicals containing halogen as substituent; hal is selected from the class consisting of chlorine and bromine; R is selected from the class consisting of alkyl and haloalkyl radicals of from 1 to 12 carbon atoms; A is selected from the class consisting of —OR and alkyl, aryl and alkaryl radicals of from 1 to 12 carbon atoms; Y is selected from the class consisting of hydrogen, the furyl radical, the thienyl radical, hydrocarbon radicals of from 1 to 17 carbon atoms and said hydrocarbon radicals carrying a substituent selected from the class consisting of halogen, —CHO, —OH, —S—S—, —CN, —NO$_2$, —COOH, —N(alkyl)$_2$, —COO-alkyl, —S-alkyl, —O—alkyl, and —NHCO-alkyl where alkyl contains from 1 to 5 carbon atoms; Z is selected from the class consisting of hydrogen and alkyl radicals of from 1 to 3 carbon atoms; and Z and Y taken together with the carbon atom to which they are attached stand for an alicyclic ring selected from the class consisting of cycloalkylene and cycloalkenylene radicals having from 5 to 6 carbon atoms in the ring and a total of from 5 to 10 carbon atoms.

Examples of halogenated ring compounds of phosphorus having the above formula and useful for the present purpose are 2-chloro- or 2-bromo-1,3,2-dioxaphospholane; 2 - chloro - 4 - methyl - 1,3,2 - dioxaphospholane; 2 - chloro - 4,5 - dimethyl - 1,3,2 - dioxaphospholane; 2-bromo-1,3,2-dioxaphosphorinane; 2-chloro-4 - methyl - 1,3,2 - dioxaphosphorinane; 2 - chloro - 1,3,2 - dioxaphosphorinane; 2 - chloro - 1,3,2 - dioxaphosphepane; 2 - chloro - 1,3,2 - benzodioxaphosphole; 2 - chloro - 4,4,5,5 - tetramethyldioxaphospholane; 2 - chloro-4 - chloromethyl - 1,3,2 - dioxaphospholane; 2,5 - dichloro - 1,3,2 - dioxaphosphorinane; 2,6,7 - trichloro-1,3,2 - benzodioxaphosphole; 2,5 - dibromo - 1,3,2 - dioxaphosphorinane; 2 - chloro - 5 - fluoro - 1,3,2 - dioxaphosphorinane; etc.

Esters of trivalent phosphorus acids which are generally useful for the preparation of the present cyclic phosphite-phosphonates by reaction with the halogenated ring compound and a carbonyl compound, according to the invention, are either simple or mixed phosphites or phosphonites. Examples of useful phosphites are trimethyl, triethyl, triisopropyl, tri-n-propyl, tri-n-butyl, tri-tert-amyl, tri-n-hexyl, tri-n-heptyl, tris(2-ethylhexyl), tri-n-octyl, tri - nonyl, tridecyl, triundecyl, tri - tert - dodecyl, amyl diethyl, butyl di-n-propyl, n-dodecyl dimethyl, ethyl octyl propyl, tris(2-chloroethyl), tris(3-chloropropyl), tris(2-chloropropyl), tris(3,4-dichlorobutyl), tris (2-bromoethyl), tris(3-iodopropyl), tris(2-fluoroethyl), tris(dichlorododecyl), 2-chloroethyl diethyl, 3-bromopropyl bis(2-chloroethyl), diamyl trichlorooctyl, 2-chloroethyl 3-chloropropyl 4-chlorobutyl, 2-chloroethyl methyl propyl, tris(2,3-dichloropropyl), etc. Examples of presently useful phosphonites that may be used are, e.g., dimethyl methylphosphonite, di-n-propyl propylphosphonite, diethyl amylphosphonite, ethyl octyl propylphosphonite, diethyl phenylphosphonite, dinonyl methylphosphonite, 2 - chloroethyl butyl propylphosphonite, bis(tetrachlorohexyl) ethylphosphonite, 2 - chlorobutyl 2-bromobutyl cyclohexylphosphonite, bis(6-bromoundecyl) 4-butylphenylphosphonite, diethyl 4-biphenylylphosphonite, bis(2-bromopropyl) dodecylphosphonite, methyl ethyl phenylphosphonite, 2-chlorobutyl butyl butylphosphonite, bis(tetrachlorobutyl) octylphosphonite, bis(2-fluoroethyl) p - tolylphosphonite, ethyl 2 - chloroethyl phenylphosphonite, bis(3-iodopropyl) phenylphosphonite, dihexyl 2,3,4,5 - tetramethylphenylphosphonite, bis(4-bromohexyl) β-naphthylphosphonite, methyl pentyl phenylphosphonite, bis(2-bromo-3-chloropropyl) biphenylylphosphonite, dimethylmethylphosphonite, diisopropyl ethylphosphonite, 3-fluoropropyl n-hexyl octylphosphonite, bis(2-chloroamyl) pentylphosphonite, dimethyl α-naphthylphosphonite, bis(2-bromopropyl) hexylphosphonite, bis(4-chlorobutyl) phenylphosphonite, diethyl 4-pentylphenylphosphonite, bis(2-chloropropyl) β-naphthylphosphonite, etc.

A particularly valuable class of carbonyl compounds which reacts with the halogen-containing ring compound of phosphorus and the trivalent phosphorus esters includes the fatty aldehydes of from 1 to 18 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, stearaldehyde, etc.

Also presently useful are the aliphatic unsaturated aldehydes, e.g., acrolein, methacrylaldehyde, crotonaldehyde, 2-methylenebutyraldehyde, 2-ethyl-2-hexenal, 2-6-dimethyl-5-heptenal, sorbaldehyde, citronellal, 2-ethyl-2-hexenal, 2-octynal, tetrolaldehyde, propiolaldehyde, 2-butyl-2-octenal, 2-allyl-4-pentenal, etc.

The presence of cyano, nitro, halogen, hydroxy, carboxy, formyl, carboalkoxy, alkoxy, alkylthio-, alkyldithio-, dialkylamino- and acylamido-substituents in the saturated or unsaturated aliphatic aldehyde has no effect on the course of the reaction; hence, there may be employed such substituted aliphatic aldehydes as 3-cyanopropionaldehyde, chloroacetaldehyde, 2-bromoacrolein, 3-butoxybutyraldehyde, 4-nitrobutyraldehyde, 4-cyano-2,2-dimethylbutyraldehyde, 2,3-dichloropropionaldehyde, 4-cyanocrotonaldehyde, hydracrylic aldehyde, 3-isopropoxypropionaldehyde, 3-(ethylthio) - 3 - methylbutyraldehyde, aldol, chloropropiolaldehyde, 3 - fluoropropionaldehyde, adipaldehydic acid, glyceraldehyde, 6-fluoro-2-hexenal, dichlorolauraldehyde, ethyl 11-formylundecanoate, β-formylpropionic acid, 4-methoxy-2,4-dimethyl-2-pentenal, succinaldehydic acid methyl ester, β-formylacrylic acid, ethyl 4-formylbutyrate, 4-methyl-2-nitrovaleraldehyde, iodoacetaldehyde, dichloroacetaldehyde, dimethylaminoacetaldehyde, N-(formylpentyl)acetamide, chloral, etc.

Presently useful alicyclic carboxaldehydes include, e.g., cyclohexanecarboxaldehyde, cyclohexenecrotonaldehyde, 6-methyl-3-cyclohexenecarboxaldehyde, 4 - nitrocyclohexanecarboxaldehyde, 2 - cyclohexene - 1 - carboxaldehyde, cyclohexadienecrotonaldehyde, cyclopentanecarboxaldehyde, 1 - cyclohexene - 1 - carboxaldehyde, 3-isopropyl-1-methylcyclohexanecarboxaldehyde, cyclohexeneacrolein, 5-ethoxy-2-cyclopentene-1-carboxaldehyde, 4-isohexyl-2-methylcyclohexanecarboxaldehyde, 1 - bromo - 2,2,6 - trimethylcyclohexanecarboxaldehyde, perillaldehyde, phellandral, safranal, 1-cyclopentene-1-carboxaldehyde, 2-bromo-bicyclo[2.2.1]hept-5-ene-2-carboxaldehyde, 2,2,6-trimethylcyclohexanecarboxaldehyde, 2,2,6 - trimethyl-2-cyclohexenecarboxaldehyde, 3,4- or 2 - hydroxycyclohexanecarboxaldehyde or 4-formylcyclohexanecarboxylic acid, etc.

The presently useful aromatic aldehydes may be purely aromatic, aromatic-cycloaliphatic, or aliphatic-aromatic aldehydes, and they may or may not be further substituted, e.g., benzaldehyde, o-, m- or p-tolualdehyde, 3,3-dimethyl-2-phenylbutyraldehyde, phenylacetaldehyde, 1- or 2-naphthaldehyde, biphenyl - 4 - carboxaldehyde, hydrocinnamaldehyde, cinnamaldehyde, atropaldehyde, 2,3-dichlorobenzaldehyde, 4'-formylacetanilide, 4-cyclohexylbenzaldehyde, phenylpropiolaldehyde, 2-, 3- or 4-butoxybenzaldehyde, p-(dimethylamino)benzaldehyde, salicylaldehyde, 3-allylsalicylaldehyde, p-(ethoxy)benzaldehyde, 2-ethoxy-4-nitrobenzaldehyde, 2-, 3- or 4-binylbenzaldehyde, 3,4-dipropoxybenzaldehyde, 4-(n-butylthio)benzaldehyde, o-, m- or p-iodobenzaldehyde, 3,4- or 3,5-dibromobenzaldehyde, 5-tert-butyl-m-tolualdehyde, 5-tert-butyl-3-nitro-o-tolualdehyde, 4-(trifluoromethyl)benzaldehyde, 2 - p - cymenecarboxaldehyde, 6-methoxy-2-naphthaldehyde, 2-nitro-1-naphthaldehyde, 4-cyclohexylbenzaldehyde, 4'-nitro-4-biphenylcarboxaldehyde, 6-methoxy-3-biphenylcarboxaldehyde, 2-, 3- or 4-hydroxybenzaldehyde, phthalaldehydic acid, opianic acid, 3-hydroxyterephthaldehydic acid, etc.

The presently useful aldehyde may also be a heterocyclic aldehyde such as 2- or 3-furaldehyde and 2- or 3-thiophenecarboxaldehyde.

Ketones, generally, are not as reactive as the aldehydes in reacting with the halogen-containing ring compound of phosphorus and the trivalent phosphorus ester. While virtually any aldehyde is useful for the present purpose, only the alkyl hydrocarbyl (or substituted hydrocarbyl) and the alkyl heterocyclic ketones in which the alkyl radical has up to 3 carbon atoms, and certain ring ketones undergo the reaction. Useful ketones are acetone, 3-hexanone, 2-heptadecanone, 3-undecanone, butyrophenone, acetophenone, cyclopropyl methyl ketone, benzyl methyl ketone, 4-cyanovalerophenone, methyl thienyl ketone, isopropyl furyl ketone, 2,4-dichloropropiophenone, 1'- or 2'-acetonaphthone, 2-ethoxyethyl methyl ketone, etc.

Presently useful ring ketones are the cycloalkylene and cycloalkenylene ring mono-ketones having from 5 to 6 carbon atoms in the ring and a total of from 5 to 10 carbon atoms, e.g., cyclohexanone, 3-cyclohexen-1-one, 5-isopropyl-3-methyl-3-cyclohexen-1-one, 2,3- or 2,5-dimethylcyclohexanone, 2-cyclohexen-1-one, 3,6-dimethyl-2-cyclohexen-1-one, 4 - tert - butylcyclohexanone, 3,4,5-trimethyl-3-cyclopenten-1-one, 2-cyclopenten-1-one, 2-butyl-3-methyl-3-cyclopenten-1-one, cyclopentanone, 3-ethylcyclopentanone, 3-tert-amylcyclopentanone, etc.

Cyclic phosphites of hydroxy phosphonates provided by the present process from an aldehyde and the mixture of trivalent phosphorus ester and halogen-containing ring compound of phosphorus have the general formula

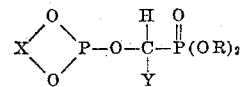

in which X, Y and R are as herein defined.

A particularly valuable class of phosphite-phosphonates of the above formula are those obtained from 2-chloro-1,3,2-dioxapholane as the phosphorus ring compound, a trialkyl or haloalkyl phosphite as the phosphorus ester and an aliphatic aldehyde as the carbonylic compound. Such hydroxy phosphonates have the formula

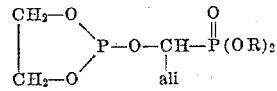

where R is selected from the class consisting of alkyl and haloalkyl radicals of from 1 to 12 carbon atoms and ali denotes an aliphatic hydrocarbon radical of from 1 to 17 carbon atoms. Such compounds are ethylene glycol phosphite (cyclic esters) of (1-hydroxyalkyl)phosphonates, of (1-hydroxyalkenyl)phosphonates or of (1-hydroxyalkynyl)phosphonates. Examples of such esters are the ethylene glycol phosphite (cyclic ester) of dimethyl (1-hydroxyethyl)phosphonate, of didodecyl (1-hydroxybutyl)phosphonate, of dibutyl (1-hydroxyoctyl)phosphonate, of dioctyl (1-hydroxy-2-pentenyl)phosphonate, of bis(2-bromo-3-chloropropyl) (1-hydroxy-2-propynyl)phosphonate, of bis(2-chloroethyl) (1-hydroxyamyl)phosphonate, of bis(tetrachlorododecyl) (1-hydroxyethyl)phosphonate, of bis(3-fluoropropyl) (1-hydroxymethyl)phosphonate, of bis(4-iodobutyl) (1-hydroxydecyl)phosphonate, of diethyl (1-hydroxybutyl)phosphonate, of diamyl (1-hydroxyoctyl)phosphonate, of didodecyl (1-hydroxypropyl)phosphonate, of ethyl methyl (1-hydroxy-2-ethylhexyl)phosphonate, of bis(2-chloroethyl) (1-hydroxyhexyl)phosphonate, of bis(2,3-dichloropropyl) (1-hydroxyethyl)phosphonate, of 2-chloroethyl isopropyl (1-hydroxymethyl)phosphonate, of bis(2-chlorohexyl) (1-hydroxydecyl)phosphonate, etc.

When the halogenated ring compound of phosphorus is 2-chloro-1,3,2-dioxaphosphorinane, the phosphorus ester is a phosphite, and the carbonylic compound is an aliphatic carboxaldehyde, the products are 1,3-propanediol phosphite (cyclic esters) of (1-hydroxyalkyl)phosphonates, of (1-hydroxyalkenyl)phosphonates or of (1-hydroxyalkynyl)phosphonates. Examples of such esters are the 1,3-propanediol (cyclic esters) of dimethyl, diethyl or dibutyl (1 - hydroxy - 2 - propenyl)phosphonate, of bis(3-bromopropyl) (1-hydroxybutyl)phosphonate, of bis(2-fluoroethyl) (1 - hydroxy-tert-dodecyl)phosphonate, of bis(2-chloroethyl) (1-hydroxyhexyl)phosphonate, of bis-(dichlorononyl) (1-hydroxy-2-butynyl)phosphonate, of bis(diiodododecyl) (1-hydroxyisopropyl)phosphonate, of ethyl propyl (1-hydroxy-tert-dodecyl)phosphonate, of bis-(2-chloroethyl) (1-hydroxy-2-hexenylhexyl)phosphonate, of bis(dichlorononyl) (1-hydroxydecyl)phosphonate, of 2-chloroethyl ethyl (1-hydroxyisooctyl)phosphonate, of 2-chloroethyl 3-bromopropyl (1-hydroxyheptyl)phosphonate, etc.

When the halogenated ring compound is 2-chloro-1,3,2-benzodioxaphosphole, the phosphorus ester is a phosphite and the carbonylic compound is an aliphatic carboxaldehyde aldehyde, the products are pyrocatechol phosphite (cyclic esters) of (1-hydroxyalkyl)phosphonates, (1-hydroxyalkenyl)phosphonates or (1-hydroxyalkynyl)phosphonates. Examples of such esters are the pyrocatechol phosphite (cyclic ester) of dimethyl, didodecyl or dibutyl (1-hydroxy-2-butenyl)phosphonate, of bis(2-chloroethyl) or bis(4,4-dibromobutyl) (1-hydroxy-2-ethylhexyl)phosphonate, of 3-iodopropyl n-propyl (1-hydroxydodecyl)phosphonate, of bis(3-fluoropropyl) (1-hydroxy-2-pentynyl)phosphonate, of amyl n-octyl (1-hydroxyethyl)phosphonate, etc.

Employing, instead of the aliphatic aldehyde, an aromatic aldehyde such as benzaldehyde or its nuclear derivatives, the products are cyclic phosphites of α-hydroxybenzyl phosphonates, e.g., the reaction of 2-chloro-1,3,2-benzodioxaphosphole, triethyl phosphite and benzaldehyde gives the pyrocatechol phosphite (cyclic ester) of (α-hydroxybenzyl)phosphonate. Employing as the aldehyde constituent a cyclic aldehyde such as naphthaldehyde, furfuryl or thiophenecarboxaldehyde, the products are cyclic phosphites of hydroxymethylphosphonates having the appropriate cyclic nucleus as a substituent in the methyl radical; e.g., the reaction of 2-chloro-4-methyl-1,3,2-dioxaphospholane, α-naphthaldehyde, and trimethyl phosphite gives the 1,2-propylene glycol ester of dimethyl [(hydroxy)(naphthyl)methyl]phosphonate; the reaction of 2-chloro-1,3,2-dioxaphosphorinane, tris(2-chloroethyl) phosphite and furfural gives the 1,3-propanediol phosphite (cyclic ester) of bis(2-chloroethyl) (α-hydroxyfurfuryl) phosphonate and that of 2-chloro-4-chloromethyl-1,3,2-dioxaphospholane, tri-n-butyl phosphite and 2-thiophenecarboxaldehyde gives the 3-chloro-1,2-propanediol phosphite (cyclic ester) of dibutyl (α-hydroxythenyl)phosphonate.

Alicyclic aldehydes react as do the aliphatic and other aldehydes mentioned above. The products according to the invention are cyclic phosphites of 1-hydroxymethylphosphonates carrying the appropriate alicyclic radical as a substituent in the methyl radical, e.g., the reaction of 2-chloro-1,3,2-dioxaphospholane, triamyl phosphite and cyclohexanecarboxaldehyde yields the ethylene glycol phosphite (cyclic ester) of diamyl (cyclohexylhydroxymethyl)phosphonate; the reaction of 2-chloro-1,3,2-benzodioxaphosphole, tris(2-chloroethyl)phosphite and 2,3-dimethylcyclopentanecarboxaldehyde gives the pyrocatechol phosphite (cyclic ester) of bis(2-chloroethyl) [(2,3-dimethylcyclopentyl)hydroxymethyl]phosphonate; and the reaction of 2-chloro-1,3,2-benzodioxaphosphole, dibutyl or tris(2-chloroethyl) phosphite and 2,3-dimethyl-2-cyclopentenecarboxaldehyde gives the pyrocatechol phosphite (cyclic ester) of dibutyl or bis(2-chloroethyl) [(2,3-dimethyl-2-cyclopentenyl)hydroxymethyl]phosphonate, etc.

As hereinbefore disclosed, the presence of such substituents as the alkoxy, halogen, carboalkoxy, thio, aldehyde, and alkyl radicals in the aldehyde constituent does not affect the course of the reaction. Thus, when instead of a fatty aldehyde there is employed, e.g., an alkoxy substituted aldehyde such as 3-butoxybutyraldehyde, the reaction product with a phosphite such as triethyl phosphite and a halogen-containing ring compound of phosphorus such as 2-chloro-1,3,2-dioxaphospholane, is the ethylene glycol phosphite (cyclic ester) of diethyl (3-butoxy-1-hydroxypentyl)phosphonate; with a substituted benzaldehyde such as 2,4-dichlorobenzaldehyde, the same phosphorus-containing reactants give the ethylene glycol phosphite (cyclic ester) of diethyl (2,4-dichloro-α-hydroxybenzyl)phosphonate, etc.

When a ketone, instead of an aldehyde, is reacted with the halogen-containing ring compound of phosphorus and the trivalent phosphorus ester, the products are cyclic phosphites of hydroxyalkylphosphonates wherein the hydroxy radical is present in the position which corresponds to the position of the carbonyl radical in the ketone which has been used. Thus, with aliphatic ketones the products have the formula

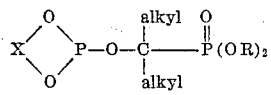

in which one alkyl radical has from 1 to 17 carbon atoms and the other alkyl radical has from 1 to 3 carbon atoms and X and R are as herein defined. The reaction product of 2-chloro-1,3,2-benzodioxaphosphole, trimethyl phosphite and acetone, for example, is the pyrocatechol phosphite (cyclic ester) of dimethyl (2-hydroxypropyl)phosphonate. As hereinbefore stated, the two valences of the carbon in the above formula may be satisfied by an alicyclic ring, i.e., the products obtained from a cycloalkane ring ketone have the formula

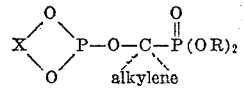

wherein the alkylene radical has from 4 to 5 carbon atoms in the chain thereof and a total of from 4 to 9 carbon atoms. Thus, the reaction product of 2-chloro-1,3,2-dioxaphospholane, tris(2-chloroethyl) phosphite and cyclohexanone yields the ethylene glycol phosphite (cyclic ester) of bis(2-chloroethyl) (hydroxycyclohexyl)phosphonate.

Phosphonite esters also react with cyclic esters of phosphorochloridic and phosphorobromidic acids and carbonyl compounds according to the process of this invention to prepare useful compounds. Thus, 2-bromo-1,3,2-dioxaphospholane as the cyclic ester halide, a phosphonite ester, and an aldehyde as the carbonylic compound yields 2-(hydrocarbyloxyhydrocarbylphosphinyl-hydrocarbyloxy)-1,3,2-dioxaphospholanes, i.e., compounds having the formula

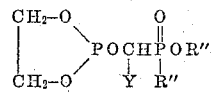

wherein R″ is as defined above and Y is the —CHO free residue of the aldehyde component. Additional examples of similar cyclic esters are:

2 - [1-(allyloxypropylphosphinyl)-2-butenyloxy]-1,3,2-dioxaphosphorinane,

2 - [α-(phenoxyethylphosphinyl)naphthyloxy]-1,3,2-dioxaphosphepane, and

2 - {1-[(2-chloropropoxy)(propyl)phosphinyl]-2-ethylhexyloxy}5,5-dimethyl-1,3,2-dioxaphosphorinane.

Instead of an aldehyde, the carbonyl compound may be a ketone. Thus, 2-chloro-1,3,2-dioxaphospholane, 2-butanone and dipropyl phenylphosphonite gives 2-[1-(propoxyphenylphosphinyl) - 1-ethylethoxy]-1,3,2-dioxaphospholane, and 2-chloro-1,3,2-benzodioxaphosphole, bis(2-chloroethyl) butylphosphonate and 2-cyclohexen-1-one gives 2 - {1-[(2-chloroethyl)(butyl)phosphinyl]-2-cyclohexenyloxy}-1,3,2-benzodioxaphosphole.

Reaction of the halogen-containing ring compound of phosphorus, trivalent phosphorus ester and the carbonyl compounds takes place readily by contacting the three reactants at ordinary or moderately increased temperatures and allowing the resulting reaction mixture to stand until formation of the phosphite-phosphonate. Thus, the trivalent organic phosphorus ester may be mixed with the phosphorus ring compound and the carbonylic compound added to the resulting mixture, or the aldehyde and the trivalent phosphorus ester may first be mixed and the halogen-containing ring compound of phosphorus added thereto. Because the reaction is generally exothermic, gradual contact of th reactants is generally recommended in order to obtain smooth reaction. However, as will be apparent to those skilled in th art, the exothermal nature of the reaction becomes less of a factor as the molecular weight of the reactants, and particularly of the trivalent phosphorus ester, increases. Also, when the carbonylic compound is a ketone rather than an aldehyde reaction is generally not as rapid as it is with the aldehydes. It is thus recommended that in each initial run, the three reactants be mixed gradually at low temperatures and that external heating be employed only when there appears to be no spontaneous increase in temperature as a consequence of the mixing. In most instances, the reaction is mildly exothermic initially. Whether the reaction goes to completion without the use of extraneous heat is determined by the nature of the reactants. Completion of the reaction in any event, can be readily ascertained by noting cessation in change of viscosity, refractive index or the quantity of by-product alkyl halide. Reaction of the three components takes place readily in the absence of an inert diluent or catalyst. However, catalysts and diluents or solvents may be employed. The use of diluents may be particularly advantageous when working with the more reactive aldehydes; such diluents may be, e.g., benzene, toluene, dioxane, methylene chloride or hexane When employing no diluent and using substantially the stoichiometric proportion of reactants, i.e., one molar equivalent of the halogen-containing ring compound of phosphorus, one molar equivalent of the trivalent phosphorus ester and one molar equivalent of the carbonyl compound, the reaction product may be used directly for a variety of industrial and agricultural purposes without purification, i.e., it consists essentially of the phosphite-phosphonate dissolved in the haloalkane which is produced as a by-product in the reaction. Such solutions may be used without further purification, e.g., as biological toxicants or gasoline additives. However, the phosphite-phosphonate is readily separated from the by-product and/or extraneous solvents, e.g., by distillation. If an excess of any one of the three reactants is initially present, such an excess may also be separated from the product by distillation.

The present phosphite-phosphonates are stable, generally high-boiling, liquid products which are advantageously used, e.g., as flame-proofing materials, particularly in the flame-proofing of synthetic resins and plastics; as functional fluids in electrical and force-transmission applications; as rubber compounding chemicals, etc.

The presently provided compounds are particularly valuable as additives to gasoline and other hydrocarbon fuels containing organolead compounds. Continued use of such fuels is known in the art to result in spark plug fouling caused by deposition of the organolead compound. Addition of the present compounds in very small quantities to the lead-containing fuels prevents such fouling. The presently provided compounds thus serve as lead scavengers. In the laboratory, the efficiency of a lead scavenger can be readily determined by noting preignition glow of deposits resulting from organolead accumulation; hence, lead scavengers are often referred to as "glow-suppressing agents." Thus, in one test, a gasoline fuel containing 0.02721 part by weight of tetraethyllead is delivered to a "Glow Testor" at the rate of 1.5±0.1 ml./15 minutes and the amount of additive required to suppress glow at 1,000° F. is measured. It has been found that tricresyl phosphate, a commercially employed lead scavenger, suppresses glow when present in the leaded gasoline in a concentration of 0.0984 part by weight. On the other hand, use of the ethylene glycol phosphite (cyclic ester) of diethyl (2-hydroxypropyl)-phosphonate suppresses glow at a concentration of only 0.0389 part by weight and use of the ethylene glycol phosphite (cyclic ester) of dimethyl (α-hydroxybenzyl)-phosphonate suppresses glow at a concentration of 0.0535 part by weight. Similarly good results are obtained with the other presently provided cyclic phospite-phosphonates or phosphite-phosphinates.

The invention is further illustrated by, but not limited to, the following examples:

*Example 1*

To a mixture consisting of 41.4 g. (0.33 mole) of trimethyl phosphite and 22 g. (0.5 mole) of acetaldehyde there was added dropwise 58.2 g. (0.33 mole) of 2-chloro-1,3,2-benzodioxaphosphole. During the addition, the temperature of the reaction mixture was kept at 18–25° C. by occasional ice-cooling. The whole was then stirred until cessation of rise in temperature. It was then heated to 85° C. in order to insure complete reaction, cooled to 75° C., placed under water-pump vacuum, and heated to 90° C. in order to remove volatile impurities. Distillation of the residue gave 85.8 g. (88.2% theoretical yield) of the substantially pure pyrocatechol (cyclic ester) of dimethyl (1-hydroxyethyl)phosphonate, B.P. 151–153° C./0.04 mm., $n_D^{25}$ 1.5140, of the following structure

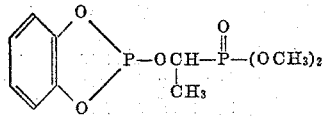

*Example 2*

To an ice-cooled mixture consisting of 131.0 g. (0.79 mole) of triethyl phosphite and 94.8 g. (0.75 mole) of 2-chloro-1,3,2-dioxaphospholane, there was added dropwise, with stirring, during 0.6 hour at a temperature of 5–19° C., 39.6 g. (0.90 mole) of acetaldehyde. During addition of the aldehyde an exothermic reaction was noted at even below 5° C., but when all of the aldehyde had been added, no heat of reaction was observed even when the reaction mixture was heated to 50° C. The reaction mixture was then subjected to water-pump vacuum and gradually heated to 80° C. to remove by-product ethyl chloride and any unreacted material; and the residue was vacuum distilled to give 169.6 g. (81.5% theoretical yield) of the substantially pure ethylene glycol phosphite (cyclic ester) of diethyl (1-hydroxyethyl)phosphonate, B.P. 106–112° C./0.1–0.2 mm., of the structure

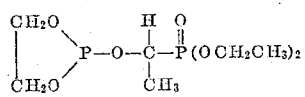

*Example 3*

Redistilled triethyl phosphite (99.5 g., 0.6 mole) and 33 g. (0.75 mole) of acetaldehyde were placed in a 500 ml. flask and cooled in ice as 63.2 g. (0.5 mole) of 2-chloro-1,3,2-dioxaphospholane was added thereto, during a period of 0.3 hour, at 5–10° C. When all of the phospholane had been added, the reaction mixture was gradually warmed to 50° C. and then submitted to distillation in vacuo to obtain 121.7 g. of the substantially pure ethylene glycol phosphite (cyclic ester) of diethyl (1-hydroxyethyl)phosphonate, B.P. 109–115° C./0.05–0.1 mm., of the structure

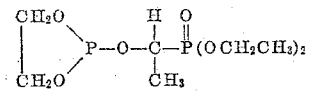

The compound analyzed as follows:

| Percent | Found | Calcd. for $C_8H_{18}O_6P_2$ |
|---|---|---|
| C | 35.83 | 35.3 |
| H | 7.01 | 6.67 |
| P | 22.64 | 22.8 |

*Example 4*

To a cooled (2° C.) mixture consisting of 140 g. (0.56 mole) of tributyl phosphite and 67.3 g. (0.532 mole) of 2-chloro-1,3,2-dioxaphospholane there was added dropwise, with stirring, during 0.2 hour, 28.2 g. (0.64 mole) of redistilled acetaldehyde. During addition of the aldehyde the temperature of the reaction mixture rose to 25° C. By-product butyl chloride and any unreacted material was removed by heating the reaction mixture to 90° C. under water-pump vacuum. Vacuum distillation of the residue gave 134.6 g. of the substantially pure ethylene glycol phosphite (cyclic ester) of dibutyl (1-hydroxyethyl)phosphonate, B.P. 140° C./0.35 mm., 154° C./0.50 mm., $n_D^{25}$ 1.4528, and analyzing 44.27% carbon and 8.22% hydrogen as against 43.9% and 7.98%, the calculated values, and having the structure

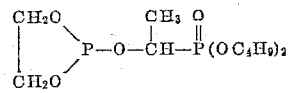

*Example 5*

To a 500 ml. flask equipped with stirrer, thermometer, reflux condenser fitted with a drying tube, and a dropping funnel, there was first charged 170 g. (0.631 mole) of tris(2-chloroethyl) phosphite and then 75.9 g. (0.60 mole) of 2-chloro-1,3,2-dioxaphospholane. The resulting solution was cooled to 3° C. by means of an ice bath, and to the cooled mixture there was added, dropwise, 31.6 g. (0.718 mole) of acetaldehyde. During the aldehyde addition the temperature gradually rose to 18° C. When the temperature began to drop, the ice bath was removed and the mixture heated to 80° C. in order to insure complete reaction. The whole was then cooled and the mixture subjected to water-pump vacuum while gradually raising the temperature in order to remove any unreacted acetaldehyde and by-product 1,2-dichloroethane. Distillation of the residue to remove material boiling below 140° C./0.05 mm., gave as residue 211.0 g. of the substantially pure ethylene glycol phosphite (cyclic ester) of bis(2-chloroethyl) (1-hydroxyethyl)phosphonate, $n_D^{25}$ 1.4909, and having the structure

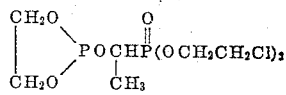

*Example 6*

To a cooled (10° C.) mixture consisting of 57.9 g. (0.411 mole) of 2-chloro-1,3,2-dioxaphosphorinane and 66.0 g. (0.411 mole) of triethyl phosphite, there was added dropwise, with stirring, 24.9 g. (0.411 mole) of propionaldehyde. During addition of the aldehyde the temperature of the reaction mixture rose exothermally to 25° C. The whole was then heated to 70° C. to insure complete reaction, and volatile impurities and by-products were removed by subjecting the mixture to water-pump vacuum and heating it to 100° C. Distillation of the residue gave 58.7 g. of the substantially pure 1,3-propanediol phosphite (cyclic ester) of diethyl (1-hydroxypropyl)phosphonate, B.P. 150° C./0.3 mm., $n_D^{25}$ 1.4563, analyzing 39.57% carbon and 7.48% hydrogen, as against 39.94% and 7.36%, the calculated values, and having the structure

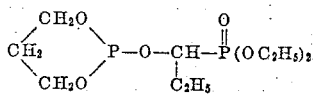

*Example 7*

Propionaldehyde (28.6 g., 0.49 mole) was added dropwise, with stirring, during a period of 0.3 hour at a temperature of 15–31° C., to a mixture consisting of 60.9 g. (0.49 mole) of trimethyl phosphite and 85.6 g. (0.49 mole) of 2-chloro-4-chloromethyl-1,3,2-dioxaphospholane. In order to insure complete reaction, the whole was heated to 75° C. Volatile impurities and by-product methyl chloride was removed by heating the reaction mixture to 100° C. under water-pump vacuum. Subsequent concentration of the reaction mixture to 140° C./0.25 mm., gave as residue 142.9 g. (95% theoretical yield) of the substantially pure 3-chloro-1,2-propanediol phosphite (cyclic ester) of dimethyl (1-hydroxypropyl)-phosphonate, $n_D^{26}$ 1.4770, of the structure

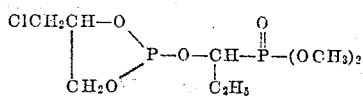

The presently provided phosphonate analyzed as follows:

| Percent | Found | Calcd. for $C_8H_{17}ClO_6P_2$ |
|---|---|---|
| C | 31.87 | 31.32 |
| H | 5.62 | 5.68 |
| Cl | 12.20 | 11.57 |

*Example 8*

To a cooled (0° C.) mixture of 122.2 g. (0.735 mole) of triethyl phosphite and 88.5 g. (0.70 mole) of 2-chloro-1,3,2-dioxaphospholane there was added, dropwise during 30 minutes, 58.0 g. (0.805 mole) of butyraldehyde. During addition of the aldehyde, the temperature of the reaction mixture rose to 22° C. The whole was then subjected to water-pump vacuum and heated to 85° C. in order to remove by-product ethyl chloride and any unreacted material. Distillation of the residue in vacuo gave 127.0 g. of the substantially pure ethylene glycol phosphite (cyclic ester) of diethyl (1-hydroxybutyl)phosphonate, B.P. 132–136° C./0.35 mm. (maximum pot temperature 180° C./0.5 mm.) analyzing 40.89% carbon and 7.76% hydrogen, as against 40.1% and 7.46%, the calculated values, and having the structure

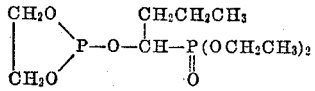

Another 7.0 g., 138° C./0.2 mm., of the phosphonate was obtained by distilling the residue remaining after removing said fraction, B.P. 132–136° C./0.35 mm.

*Example 9*

Redistilled triethyl phosphite (109.7 g., 0.66 mole) and 75.9 g. (0.6 mole) of 2-chloro-1,3,2-dioxapholane were charged to a reaction vessel; the resulting solution was cooled to 1° C., and there was added thereto 84.7 g. (0.725 mole) of redistilled 2-ethylhexaldehyde during 30 minutes. During addition of the aldehyde the temperature of the reaction mixture rose spontaneously to 22° C. The reaction mixture was then heated to 65° C., placed under water-pump vacuum and subsequently heated to 100° C. in order to remove by-product ethyl chloride and any unreacted material. Distillation of the residue gave 156.0 g. (73% theoretical yield) of the substantially pure ethylene glycol phosphite (cyclic ester) of diethyl (2-ethyl-1-hydroxyhexyl)phosphonate, B.P. 151–155° C./0.15 mm., of the structure

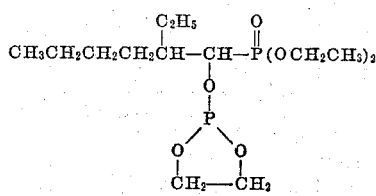

The presently provided phosphonate analyzed as follows:

| Percent | Found | Calcd. for $C_{14}H_{30}O_6P_2$ |
|---|---|---|
| C | 46.79 | 47.15 |
| H | 8.50 | 8.48 |
| P | 17.09 | 17.33 |

*Example 10*

To a mixture consisting of 116.9 g. (0.43 mole) of tris(2-chloroethyl) phosphite and 78.7 g. (0.45 mole) of 2-chloro-4-chloromethyl-1,3,2-dioxaphospholane, there was added dropwise, with stirring, 57.6 g. (0.45 mole) of 2-ethylhexaldehyde. During addition of the aldehyde, the temperature increased to 31° C.; at this point cooling was applied and the remainder of the aldehyde was added while maintaining the reaction mixture at a temperature of 10–20° C. When all of the aldehyde had been added, the reaction mixture was stirred at room temperature for a period of 0.3 hour and then heated to 80° C. in order to insure complete reaction. Removal of volatile by-products and impurities by heating the mixture to 100° C. under water-pump vacuum, and concentration to 145° C./0.15 mm., gave as residue 198.5 g. (97.3% theoretical yield) of the substantially pure 3-chloro-1,2-propanediol phosphite (cyclic ester) of bis(2-chloroethyl) (2-ethyl-1-hydroxyhexyl)phosphonate, $n_D^{25}$ 1.4871, of the structure

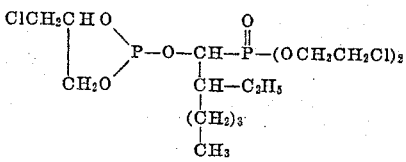

*Example 11*

To a mixture consisting of 87 g. (0.7 mole) of trimethyl phosphite and 63.2 g. (0.5 mole) of 2-chloro-1,3,2-dioxaphospholane there was gradually added, during a period of 0.3 hour, 39.2 g. (0.7 mole) of acrolein containing 1.1% hydroquinone as stabilizer. During acrolein addition, the temperature of the reaction mixture was maintained at 23–28° C. by external cooling. When all of the acrolein had been added, the reaction mixture was heated to 112° C. and then distilled in vacuo to give 68 g. of the substantially pure 2-[1-(dimethoxyphosphinyl)-2-propenyloxy]-1,3,2-dioxaphospholane, B.P. 134–145° C./1.5 mm., $n_D^{25}$ 1.4725, of the structure

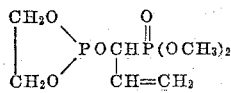

Example 12

To 40 g. (0.72 mole) of redistilled acrolein containing 1% of hydroquinone there was gradually added with cooling, during a period of 0.3 hour, 63.2 g. (0.50 mole) of 2-chloro-1,3,2-dioxaphospholane. During the addition of the phospholane, the temperature of the reaction mixture was maintained at from minus 1° C. to 4° C. To the cooled reaction mixture there was then added 150 g. (0.6 mole) of tributyl phosphite during a period of 0.2 hour. Cooling was discontinued and the whole warmed to 78° C. Distillation in vacuo to remove material boiling below 105° C./0.2 mm., gave as residue 181.8 g. of colorless 2-[1-dibutoxyphosphinyl)-2-propenyloxy]-1,3,2-dioxaphospholane, $n_D^{25}$ 1.4678, analyzing 46.4% carbon and 7.6% hydrogen as against 45.9% and 7.7%, the calculated values.

Example 13

To a mixture consisting of 55.8 g. (0.45 mole) of trimethyl phosphite and 50.7 g. (0.4 mole) of 2-chloro-1,3,2-dioxaphospholane there was added, with cooling, during 0.2 hour 28 g. (0.4 mole) of methacrolein. After all of the methacrolein had been added, cooling was discontinued and the temperature of the reaction mixture increased spontaneously to 41° C. The colorless reaction mixture was then warmed at 60–68° C. for 0.5 hour. Distillation gave 83.5 g. (77% theoretical yield) of the substantially pure 2-[(dimethoxyphosphinyl)-2-methyl-2-propenyloxy]-1,3,2-dioxaphospholane, B.P. 132–140° C./0.1 mm., analyzing 35.71% carbon, 6.27% hydrogen and 23.20% phosphorus as against 35.6%, 6.0% and 23.0%, the calculated values, and having the structure

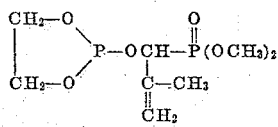

Example 14

To a cooled mixture of 63.7 g. (0.6 mole) of benzaldehyde and 62 g. (0.5 mole) of trimethyl phosphite there was added, during a period of 0.2 hour at a temperature of 5–10° C., 60.5 g. (0.48 mole) of 2-chloro-1,3,2-dioxaphospholane. When all of the phospholane had been added, extraneous cooling was discontinued and the temperature of the reaction mixture rose spontaneously to 36° C. A total of 20.8 g. of methyl chloride was collected in the Dry-Ice trap during the reaction. Distillation of the resulting reaction mixture to remove material boiling below 160° C./0.3 mm., gave as residue 145 g. (98.5% theoretical yield) of the substantially pure ethylene glycol phosphite (cyclic ester) of dimethyl (α-hydroxybenzyl)phosphonate having the structure

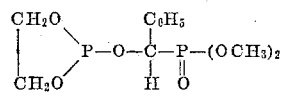

Example 15

2-chloro-1,3,2-benzodioxaphosphole (68.4 g., 0.392 mole) was added dropwise to a mixture consisting of 65.1 g. (0.392 mole) of triethyl phosphite and 41.6 g. (0.392 mole) of benzaldehyde. During the addition of the aldehyde, the temperature of the reaction mixture rose from 25° C. to 31° C., at which point the reaction vessel was placed in an ice bath. The remainder of the aldehyde was added while maintaining the temperature of the mixture at 25–28° C. External cooling was discontinued and the reaction mixture allowed to stand until cessation in temperature rise (35° C. maximum). It was then heated to 90° C. in order to insure complete reaction, cooled to 35° C., subjected to water-pump vacuum and heated to 100° C. in order to remove by-product ethyl chloride and any unreacted material. Concentration to 125° C./0.7 mm., gave as residue 146.8 g. (97.7% theoretical yield) of the substantially pure pyrocatechol phosphite (cyclic ester) of diethyl (α-hydroxybenzyl)phosphonate, $n_D^{25}$ 1.5394, analyzing 52.88% carbon and 5.40% hydrogen as against 53.41% and 5.26%, the calculated values, and having the structure

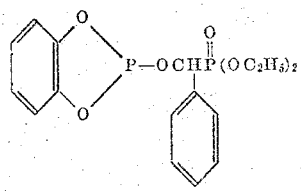

Example 16

To a mixture consisting of 91.5 g. (0.55 mole) of triethyl phosphite and 96.1 g. (0.55 mole) of 2-chloro-4-chloromethyl-1,3,2-dioxaphospholane there was added dropwise, with stirring, 58.4 g. (0.55 mole) of benzaldehyde. During addition of the benzaldehyde, the temperature rose to 35° C.; at this point cooling was applied and the remainder of the aldehyde was added while maintaining the reaction mixture at 25–30° C. Subsequent heating of the reaction mixture to 75° C. in order to insure complete reaction, removal of volatile by-product by heating under water-pump vacuum at 100° C., and distillation of the residue to remove material boiling below 150° C./0.2 mm., gave as residue 203.6 g. of the substantially pure 3-chloro-1,2-propanediol phosphite (cyclic ester) of diethyl (α-hydroxybenzyl)phosphonate, $n_D^{25}$ 1.5149, of the structure

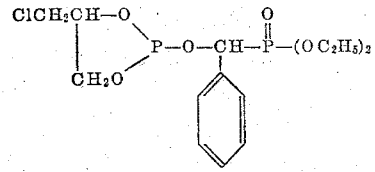

The presently provided phosphonate analyzed as follows:

| Percent | Found | Calcd. for $C_{14}H_{21}ClO_6P_2$ |
| --- | --- | --- |
| C | 44.19 | 43.91 |
| Cl | 9.76 | 9.26 |

Example 17

1-naphthaldehyde (78.1 g., 0.5 mole) was added dropwise to a mixture consisting of 62.2 g. (0.5 mole) of trimethyl phosphite and 87.4 g. (0.5 mole) of 2-chloro-4-chloromethyl-1,3,2-dioxaphospholane. The reaction mixture was then heated to 29° C., external heating was discontinued and the temperature of the exothermic reaction was maintained at below 52° C. by ice-cooling at intervals. When cessation of the temperature increase was noted, the mixture was heated at 60–75° C. for 2 hours. It was then subjected to water-pump vacuum and heated to 113° C. in order to remove impurities and by-products. The residue comprised the 3-chloro-1,2-propanediol phosphite (cyclic ester) of dimethyl (1-naphthylhydroxymethyl)phosphonate, of the structure

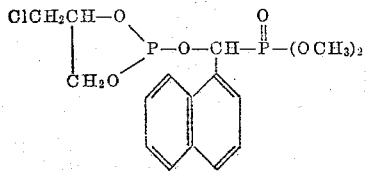

Example 18

To a mixture consisting of 51.4 g. (0.414 mole) of trimethyl phosphite and 72.3 g. (0.414 mole) of 2,4-dichlorobenzaldehyde dissolved in about 250 ml. of dichloromethane, there was added dropwise, with stirring, 52.3 g. (0.414 mole) of 2-chloro-1,3,2-dioxaphospholane. During the addition, the temperature increased from 24° C. to 30° C., at which point ice-cooling was applied and the remainder of the phospholane was added at a temperature of 27–30° C. The whole was then stirred at room temperature for 30 minutes. At the end of that time, the mixture was warmed at reflux (40° C.) for another 30 minutes in order to insure complete reaction. By-product methyl chloride and any unreacted material were removed by placing it under water-pump vacuum and warming it to 40° C. Concentration to 110° C./0.05 mm., gave as residue 154.4 g. (99.6% theoretical yield) of the substantially pure ethylene glycol phosphite (cyclic ester) of diethyl (2,4-dichloro-α-hydroxybenzyl)-phosphonate, $n_D^{25}$ 1.5422, analyzing 35.19% carbon and 3.87% hydrogen as against 35.25% and 3.76%, the calculated values, and having the structure

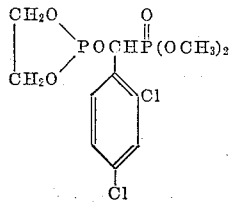

Example 19

Ethyl acetoacetate (78. g., 0.6 mole) was gradually added to a mixture of 75.8 g. (0.6 mole) of 2-chloro-1,3,2-dioxaphospholane and 108 g. (0.65 mole) of triethyl phosphite. After warming the colorless solution at 60–65° C. for 3 hours, concentration under water-pump pressure to 70° C., and distillation at higher vacuum, there was obtained 85.7 g. of colorless liquid, B.P. 120–164° C./0.1 mm., which upon redistillation gave 57.7 g. of the substantially pure ethylene glycol phosphite (cyclic ester) of ethyl-3-hydroxy-3-diethoxyphosphinyl butyrate, B.P. 148–150° C./0.1 mm., $n_D^{25}$ 1.4622 of the structure

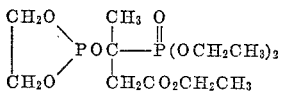

The presently obtained ester analyzed as follows:

| Percent | Found | Calcd. for $C_{12}H_{24}O_8P_2$ |
| --- | --- | --- |
| C | 40.05 | 40.2 |
| H | 6.55 | 6.75 |
| P | 17.40 | 17.3 |

Example 20

To ice-cooled 2-chloro-1,3,2-dioxaphospholane (63.2 g., 0.5 mole) there was added, during about 5 minutes, 51.6 g. (0.25 mole) of 2,2′-dithiobis(isobutyraldehyde); and then to the resulting mixture there was gradually introduced 83 g. (0.5 mole) of triethyl phosphite. During the first half of the phosphite addition, a slight exothermic (8–12° C.) reaction was observed. The whole was then warmed to 60° C. and distilled in vacuo to remove material boiling below 42° C./1 mm. There was then obtained as residue 125.5 g. of the yellow, viscous, substantially pure ester having the structure

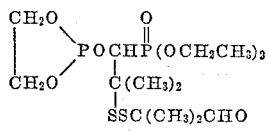

Example 21

To a cooled mixture consisting of 69.6 g. (0.57 mole) of 4-hydroxybenzaldehyde and 94.8 g. (0.57 mole) of triethyl phosphite there was added 72.2 g. (0.57 mole) of 2-chloro-1,3,2-dioxaphospholane during 20 minutes. Toward the end of the phospholane addition, about 50 ml. of methylene dichloride was added to the reaction mixture. After all of the phospholane had been added, the reaction mixture was stirred for about 1.5 hours, during which time the temperature was noted to rise to 35° C. There was thus obtained a methylene dichloride solution of 2-[α-(diethoxyphosphenyl)-4-hydroxybenzyloxy]-1,3,2-dioxaphospholane having the structure

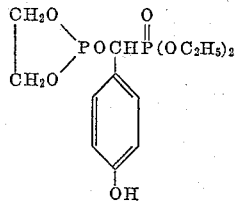

Example 22

To a cooled mixture consisting of 94.6 g. (0.57 mole) of triethyl phosphite and 72.0 g. (0.57 mole) of 2-chloro-1,3,2-dioxaphospholane there was added, during 30 minutes, 68.6 g. (0.57 mole) of redistilled salicylaldehyde. When all of the aldehyde had been added, the mixture was allowed to attain room temperature, stirred for 20 minutes, and then heated to 45° C. in order to insure complete reaction. Volatile by-product was removed by subjecting the mixture to a vacuum of 2.0 mm. There was thus obtained the substantially pure 2-[α-(diethoxyphosphinyl)-2-hydroxybenzyl]-1,3,2-dioxaphospholane,

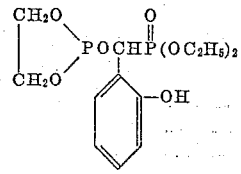

Example 23

To a mixture consisting of 49.5 g. (0.312 mole) of 4-acetamidobenzaldehyde and 38.8 g. (0.312 mole) of trimethyl phosphite dissolved in methylene chloride there was added dropwise 39.5 g. (0.312 mole) of 2-chloro-1,3,2-dioxaphospholane while cooling at 25–35° C. The whole was allowed to stand until cessation in temperature rise. It was then refluxed for one hour to insure complete reaction. The solvent and by-product methyl chloride were removed by subjecting the reaction mixture to water-pump vacuum. The residue comprises 2-[α-(dimethoxyphosphinyl) - 4 - acetamidobenzyloxy]-1,3,2-dioxaphospholane,

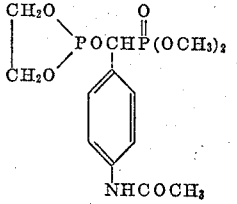

Example 24

A mixture consisting of 58.2 g. (0.35 mole) of triethyl phosphite and 28.8 g. (0.3 mole) of redistilled furfural was cooled in ice as 37.9 g. (0.3 mole) of 2-chloro-1,3,2-dioxaphospholane was added thereto during 20 minutes. An exothermic reaction was noted throughout the addition. The whole was then stirred for one hour while cooling with ice, and then warmed to 52° C. Concentration of the whole to a pot temperature of 102° C./2.5 mm. to remove by-product ethyl chloride and excess triethyl phosphite, gave as residue 99.5 g. of the substantially pure ethylene glycol phosphite (cyclic ester) of diethyl (α-hydroxyfurfuryl)phosphonate, $n_D^{25}$ 1.4908, analyzing 40.22% carbon and 5.53% hydrogen as against 40.7% and 5.6%, the calculated values, and having the structure

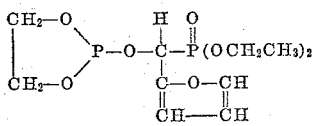

Example 25

To a mixture consisting of 29.6 g. (0.178 mole) of triethyl phosphite and 22.53 g. (0.178 mole) of 2-chloro-1,3,2-dioxaphospolane there was added dropwise, with stirring, 20.0 g. (0.178 mole) of 2-thiophenecarboxaldehyde. During the addition the temperature of the reaction mixture rose from 17° C. to 35° C., at which point cooling was applied to bring the temperature down to 21° C. When all of the aldehyde had been added, cooling was discontinued and the reaction mixture heated to 60° C. It was then subjected to water-pump vacuum and heated to 80° C. in order to remove by-product ethyl chloride and any unreacted starting material. Distillation of the residue to remove material boiling below 163° C./0.35 mm., gave as residue 46.6 g. of the substantially pure ethylene glycol phosphite (cyclic ester) of diethyl (α-hydroxythenyl)phosphonate, $n_D^{25}$ 1.5278, having the structure

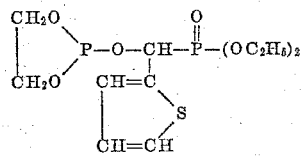

The presently provided phosphonate analyzed as follows:

| Percent | Found | Calcd. for $C_{11}H_{18}O_6P_2S$ |
| --- | --- | --- |
| C | 37.31 | 38.81 |
| H | 5.41 | 5.33 |
| S | 8.81 | 9.41 |

Example 26

1,4,5,6,7,7-hexachlorobicyclo[2.2.1]hept-5-ene-2-carboxaldehyde (85.5 g., 0.26 mole), in enough dichloromethane to solubilize it, was mixed with 32.4 g. of trimethyl phosphite. The mixture was placed in an ice bath, and 45.4 g. (0.26 mole) of 2-chloro-1,3,2-benzodioxaphosphole was added dropwise thereto. During the addition the temperature of the reaction mixture rose from 5° C. to 17° C., and at this point the rate of phosphole addition was regulated in order to maintain the temperature at 14–17° C. When all of the phosphole had been added, external cooling was discontinued and the reaction mixture stirred until cessation in temperature increase. It was then heated at reflux for 30 minutes, placed under water-pump vacuum and warmed to 40° C. in order to remove the solvent and by-product methyl chloride. The residue comprised the phosphonate of the structure

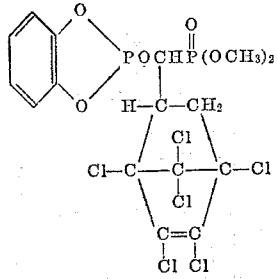

Example 27

To a solution of 74.4 g. (0.6 mole) of trimethyl phosphite and 63.2 g. (0.5 mole) of 2-chloro-1,3,2-dioxaphospholane there was added, during a period of 0.2 hour, 34.8 g. (0.6 mole) of acetone, with cooling. When the bath was removed, the temperature increased spontaneously to 48° C.; it was then brought to 101° C. within 1.25 hours by external heating. A total of 24.0 g. of colorless liquid (probably methyl chloride and unreacted acetone) collected in the Dry-Ice trap which formed a part of the reaction equipment. Distillation of the reaction mixture gave 78.4 g. of the substantially pure ethylene glycol phosphite (cyclic ester) of dimethyl (2-hydroxy-2-propyl)phosphonate, B.P. 117–127° C./1.5 mm., $n_D^{25}$ 1.4627, of the formula

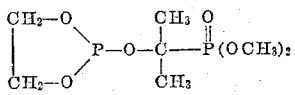

Example 28

To a mixture consisting of 99.6 g. (0.6 mole) of triethyl phosphite and 43.5 g. (0.75 mole) of acetone there was added, during 0.3 hour, 63.2 g. (0.5 mole) of 2-chloro-1,3,2-dioxaphospholane, while maintaining the temperature of the reaction mixture at 32–36° C. by ice-cooling. The whole was then gradually warmed to 85° C. and distilled to give 126.5 g. (88% yield) of the substantially pure ethylene glycol (cyclic ester) of diethyl (2-hydroxy-2-propyl)phosphonate, B.P. about 113° C./0.1 mm., $n_D^{25}$ 1.4550, which analyzed 37.62% carbon and 7.06% hydrogen as against 37.7% and 7.05%, the respective calculated values, and having the structure

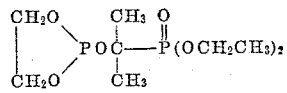

Example 29

To a mixture consisting of 78.4 g. (0.62 mole) of 2-chloro-1,3,2-dioxaphospholane and 104 g. (0.62 mole) of triethyl phosphite there was gradually added, during a time of 0.3 hour, 60.8 g. (0.62 mole) of 5-hexen-2-one. During the addition the temperature of the reaction mixture rose from 24° C. to 33° C. When all of the hexenone had been added, the mixture was stirred at room temperature for 30 minutes. It was then heated to 70° C. and maintained at this temperature for one hour. By-product ethyl chloride and any unreacted starting materials were removed by subjecting the reaction mixture to water-pump vacuum at 60° C. Distillation of the residue gave 83.9 g. of the substantially pure ethylene glycol phosphite (cyclic ester) of diethyl (2-hydroxyhexen-5-yl)phosphonate, B.P. 156–161° C./0.2 mm., $n_D^{25}$ 1.4679, of the structure

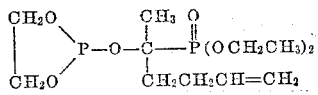

Example 30

To a mixture consisting of 68.5 g. (0.57 mole) of acetophenone and 70.8 g. (0.57 mole) of trimethyl phosphite there was added dropwise, during 15 minutes, 72.1 g. (0.57 mole) of 2-chloro-1,3,2-dioxaphospholane. During the addition the temperature of the reaction mixture increased from 25° C. to 33° C. After stirring the whole for 30 minutes, it was heated to 70–75° C. for 1.5 hours in order to insure complete reaction. By-product methyl chloride and any unreacted material were removed by subjecting the reaction mixture to water-pump vacuum and heating to 80° C. The residue comprised the ethylene glycol phosphite (cyclic ester) of (α-hydroxy-α-methylbenzyl)phosphonate of the structure

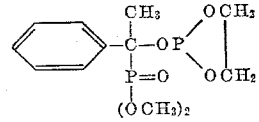

Example 31

To a mixture consisting of 63.2 g. (0.5 mole) of 2-chloro-1,3,2-dioxaphospholane and 60 g. (0.5 mole) of acetophenone there was gradually added 83 g. (0.5 mole) of triethyl phosphite. The resulting colorless solution was warmed to 98° C. in order to remove by-product and any unreacted material. Distillation to remove material boiling below 48° C./0.3 mm. (maximum pot temperature, 100° C.) gave as residue 102.3 g. of the substantially pure ethylene glycol phosphite (cyclic ester) of diethyl (α-hydroxy-α-phenylethyl)phosphonate of the structure

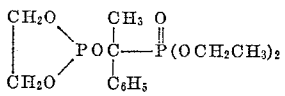

*Example 32*

To a cooled (2° C.) mixture consisting of 52.5 g. (0.316 mole) of triethyl phosphite and 37.9 g. (0.3 mole) of 2-chloro-1,3,2-dioxaphospholane there was added dropwise, with stirring, during a period of 0.2 hour, 25.2 g. (0.30 mole) of cyclopropyl methyl ketone. During the addition the temperature of the reaction mixture was maintained at from 2–6° C. When all of the ketone had been added, extraneous cooling was discontinued, whereby the temperature of the reaction mixture rose to 23° C. The whole was then heated to 50° C. and maintained at a temperature of 50–60° C. for one hour. At the end of that time it was subjected to water-pump vacuum and heated to 70° C. in order to remove impurities and unreacted starting materials. Distillation of the residue gave the substantially pure ethylene glycol phosphite (cyclic ester) of diethyl (1-cyclopropyl-1-hydroxyethyl)phosphonate, B.P. 136° C./0.1 mm., $n_D^{25}$ 1.4684, of the structure

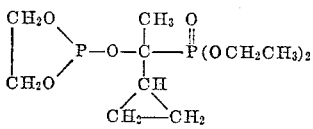

The presently provided phosphonate analyzed 41.03% carbon and 7.22% hydrogen, as against 42.3% and 7.09%, the calculated values.

*Example 33*

To a cooled (2° C.) mixture consisting of 113.2 g. (0.682 mole) of triethyl phosphite and 82.2 g. (0.65 mole) of 2-chloro-1,3,2-dioxaphospholane there was added dropwise, with stirring, during 0.3 hour, 60.3 g. (0.716 mole) of cyclopentanone. The whole was then heated to 29° C., whereby an exothermic reaction was evidenced. Extraneous heating was then discontinued and the temperature of the reaction mixture rose spontaneously to a maximum of 45° C. In order to insure complete reaction, the mixture was heated to 85° C. It was then submitted to water-pump vacuum and heated to 100° C. for removal of by-product ethyl chloride and any unreacted material. Distillation of the residue gave 106.0 g. of the substantially pure ethylene glycol phosphite (cyclic ester) of diethyl (1-hydroxycyclopentyl)-phosphonate, B.P. 142–145° C./0.15 mm., $n_D^{25}$ 1.4741, of the structure

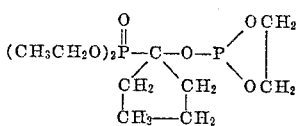

*Example 34*

To a mixture consisting of 37.1 g. (0.298 mole) of trimethyl phosphite and 29.3 g. (0.298 mole) of cyclohexanone, there was added, over a 10-minute period, 52 g. (0.298 mole) of 2-chloro-1,3,2-benzodioxaphosphole. During the addition the temperature of the reaction mixture increased from 22° C. to 30° C. Subsequently, the mixture was allowed to stand until the temperature of the exothermic reaction rose to 36° C., at which point it was cooled to 20° C. Stirring was then continued without external cooling for about an hour. At the end of that time, the mixture was heated to 85° C. in order to insure complete reaction, cooled to 70° C., placed under water-pump vacuum, and heated to 102° C. in order to remove by-product methyl chloride and any unreacted material. The residue which solidified upon cooling consisted of 103.2 g. (100% theoretical yield) of the substantially pure pyrocatechol phosphite (cyclic ester) of dimethyl (1-hydroxycyclohexyl)phosphonate of the structure

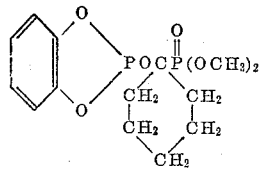

*Example 35*

To a cooled (0° C.) mixture consisting of 113.7 g. (0.71 mole) of triethyl phosphite and 82.5 g. (0.65 mole) of 2-chloro-1,3,2-dioxaphospholane there was added dropwise, with stirring, during 30 minutes, 70.1 g. (0.715 mole) of cyclohexanone. The temperature of the reaction mixture rose to 23° C. during the cyclohexanone addition. The whole was then warmed to 70° C., subjected to water-pump vacuum, and heated to 95° C. Subsequent distillation gave 169.0 g. (79.7% theoretical yield) of the substantially pure ethylene glycol phosphite (cyclic ester) of diethyl (1-hydroxycyclohexyl)phosphonate, B.P. 156–158° C./0.3 mm., 152–153° C./0.2 mm., $n_D^{26}$ 1.4779, of the structure

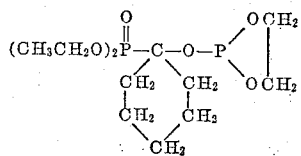

The presently provided phosphonate analyzed as follows:

| Percent | Found | Calcd. for $C_{12}H_{24}O_6P_2$ |
|---|---|---|
| C | 44.43 | 44.16 |
| H | 7.55 | 7.48 |
| P | 18.76 | 18.98 |

*Example 36*

2-chloro-1,3,2-benzodioxaphosphole (69.8 g., 0.4 mole) was added, during 15 minutes, to a mixture consisting of 134 g. (0.4 mole) of tri-n-hexyl phosphite and 39.3 g. (0.4 mole) of cyclohexanone. During addition of the phosphole, the temperature of the reaction mixture was maintained at 25–30° C. by occasional cooling. The whole was then stirred until cessation in temperature rise, employing external cooling in order to maintain the temperature of the mixture at below 40° C. The reaction was completed by heating the mixture to 95° C.; and by-product n-hexyl chloride was removed by heating the mixture to 115° C. under water-pump vacuum. Concentration to 168° C./0.4 mm., gave as residue 189.5 g. (99.6% yield) of the substantially pure pyrocatechol phosphite (cyclic ester) of di-n-hexyl (1-hydroxycyclohexyl)-phosphonate, $n_D^{25}$ 1.4970, analyzing 58.55% carbon and 8.80% hydrogen as against 59.21% and 8.27%, the calculated values, and having the structure

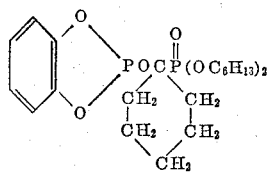

*Example 37*

To a mixture consisting of 44.2 g. (0.45 mole) of cyclohexanone and 126.8 g. (0.47 mole) of tris(2-chloroethyl) phosphite cooled to 12° C., there was added dropwise 78.5 g. (0.45 mole) of 2-chloro-1,3,2-benzodioxaphosphole. Occasional cooling was employed to keep the temperature of the reaction mixture below 40° C. during addition of the phosphole. The mixture was then allowed to stand at room temperature and stirred until cessation in temperature rise. It was then heated to 80° C. in order to insure complete reaction, placed under water-pump vacuum and heated to 110° C. to remove by-product 1,2-dichloroethane and any unreacted material, and finally concentrated to 146° C./0.2 mm. There was thus obtained as residue 202.0 g. of the substantially pure pyrocatechol phosphite (cyclic ester) of bis(2-chloroethyl) (1-hydroxycyclohexyl)phosphonate, $n_D^{25}$ 1.5302, of the following structure

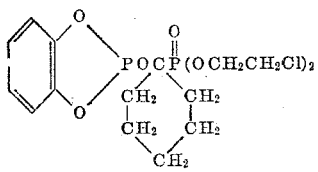

*Example 38*

To a mixture consisting of 5.0 g. (0.027 mole) of diethyl butylphosphonite and 2.0 g. (0.034 mole) of propionaldehyde there was added 5.2 g. (0.029 mole) of 2-chloro-4,5-benzo-1,3,2-dioxaphospholane. During the addition the temperature increased from 15° to 22° C. The mixture was then heated to 60° C. to insure complete reaction. Concentration at reduced pressure gave as residue 2 - [1 - (ethoxybutylphosphinyl)propyloxy] - 4,5 - benzo - 1,3,2-dioxaphospholane.

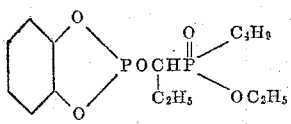

*Example 39*

To a mixture consisting of 9.9 g. (0.05 mole) of diethyl phenylphosphonite and 7.6 g. (0.05 mole) of vanillin there was added 8.7 g. (0.05 mole) of 2-chloro-4,5-benzo-1,3,2-dioxaphospholane dropwise in a few minutes. A water bath was used for cooling to moderate the reaction. When the addition was completed, the mixture was heated to 65° C. to insure complete reaction. The mixture was then concentrated at reduced pressure to give 2-[α-(ethoxyphenylphosphinyl) - 3 - methoxy - 4 - hydroxy-benzyloxy]-4,5-benzo-1,3,2-dioxaphospholane as a very viscous pale yellow liquid in almost quantitive yield.

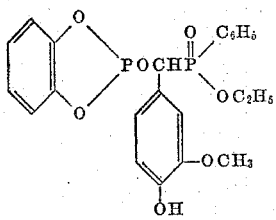

*Example 40*

Into a 500 ml. flask equipped with a stirrer, thermometer, condenser with drying tube, and a dropping funnel there was placed 49.6 g. (0.25 mole) of diethyl phenylphosphonite and 34.1 g. (0.25 mole) of p-anisaldehyde. Then 31.7 g. (0.25 mole) of 2-chloro-1,3,2-dioxaphospholane was added dropwise in ten minutes at 25–35° C., using an ice path for cooling throughout the addition. When the addition was completed, the mixture was stirred until no further reaction was apparent and then concentrated at reduced pressure to give as residue 98.5 g. of viscous, colorless 2-[α-(ethoxyphenylphosphinyl)-p-methoxybenzyloxy]-1,3,2-dioxaphospholane,

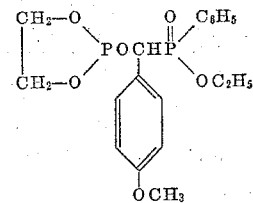

*Example 41*

To a mixture consisting of 18.3 g. of 2-ethylhexaldehyde and 28.3 g. of diethyl phenylphosphonite there was added dropwise, during 5 minutes, 18.1 g. of 2-chloro-1,3,2-dioxaphospholane. During the addition the temperature of the reaction mixture was maintained at from 20° to 30° C. by means of ice-bath cooling. When all of the dioxaphospholane had been added, the mixture was stirred at room temperature until cessation of temperature-increase, and it was then heated to 110° C. in order to insure complete reaction. It was then allowed to cool to room temperature, placed under water-pump vacuum, and warmed to 85° C. in order to remove by-product ethyl chloride. Concentration of the remainder to 120° C./0.25 mm. gave as residue 55.5 g. (100% theoretical yield) of 2-[1-(ethoxyphenylphosphinyl) - 2 - ethylhexyloxy] - 1,3,2 - dioxaphospholane of the formula:

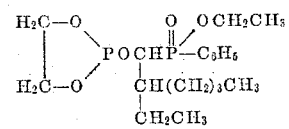

where $C_6H_5$ denotes the phenyl radical.

This application is a continuation-in-part of my application Serial No. 780,221, filed December 15, 1958, now abandoned.

What I claim is:

1. An organic phosphorus compound of the formula

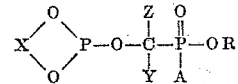

in which X is selected from the class consisting of bivalent alkylene and arylene radicals of from 2 to 6 carbon atoms and said radicals containing chlorine as substituent; R is selected from the class consisting of alkyl and haloalkyl radicals of from 1 to 12 carbon atoms; A is selected from the class consisting of —OR and alkyl, aryl and alkaryl radicals of from 1 to 12 carbon atoms; Y is selected from the class consisting of hydrogen, the furyl radical, the thienyl radical, hydrocarbon radicals of from 1 to 12 carbon atoms and said hydrocarbon radicals carrying a substituent selected from the class consisting of halogen, —CHO, —OH, —S—S—, —CN, —NO₂, —COOH, —N(alkyl)₂, —COO-alkyl, —S-alkyl, —O-alkyl, and —NHCO-alkyl where alkyl contains from 1 to 5 carbon atoms; Z is selected from the class consisting of hydrogen and alkyl radicals of from 1 to 3 carbon atoms; and Z and Y taken together with the carbon atom to which they are attached stand for an alicyclic ring selected from the class consisting of cycloalkylene and cycloalkenylene radicals having from 5 to 6 carbon atoms in the ring and a total of from 5 to 10 carbon atoms.

2. A phosphorus compound of the formula

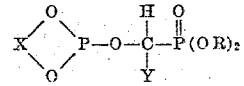

in which X is selected from the class consisting of bivalent alkylene and arylene radicals of from 2 to 6 carbon atoms and said radicals containing chlorine as substituent; R is selected from the class consisting of alkyl and haloalkyl radicals of from 1 to 12 carbon atoms; and Y is selected from the class consisting of hydrogen, the furyl radical, the thienyl radical, hydrocarbon radicals of from 1 to 12 carbon atoms and said hydrocarbon radicals carrying a substituent selected from the class consisting of halogen, —CHO, —OH, —S—S—, —CN, —NO₂, —COOH, —N(alkyl)₂, —COO-alkyl, —S-alkyl, —O-alkyl, and —NHCO-alkyl where alkyl contains from 1 to 5 carbon atoms.

3. A phosphorus compound of the formula

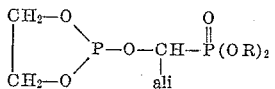

wherein R is selected from the class consisting of alkyl and haloalkyl radicals of from 1 to 12 carbon atoms and ali denotes an aliphatic hydrocarbon radical of from 1 to 12 carbon atoms.

4. A phosphorus compound of the formula

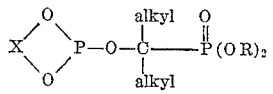

in which one alkyl radical has from 1 to 12 carbon atoms and the other alkyl radical has from 1 to 3 carbon atoms, X is selected from the class consisting of bivalent alkylene and arylene radicals of from 2 to 6 carbon atoms and said radicals containing chlorine as substituent, and R is selected from the class consisting of alkyl and haloalkyl radicals of from 1 to 12 carbon atoms.

5. A phosphorus compound of the formula

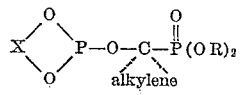

wherein the alkylene radical has from 4 to 5 carbon atoms in the chain thereof and a total of from 4 to 9 carbon atoms, X is selected from the class consisting of bivalent alkylene and arylene radicals of from 2 to 6 carbon atoms and said radicals containing chlorine as substituent, and R is selected from the class consisting of alkyl and haloalkyl radicals of from 1 to 12 carbon atoms.

6. The pyrocatechol (cyclic ester) of dimethyl (1-hydroxyethyl)phosphonate.

7. The ethylene glycol phosphite (cyclic ester) of diethyl (1-hydroxyethyl)phosphonate.

8. The ethylene glycol phosphite (cyclic ester) of bis(2-chloroethyl) (1-hydroxyethyl)phosphonate.

9. The 3-chloro-1,2-propanediol phosphite (cyclic ester) of dimethyl (1-hydroxypropyl)phosphonate.

10. The ethylene glycol phosphite (cyclic ester) of diethyl (2-ethyl-1-hydroxyhexyl)phosphonate.

11. The ethylene glycol phosphite (cyclic ester) of dimethyl (α-hydroxybenzyl)phosphonate.

12. The 3-chloro-1,2-propanediol phosphite (cyclic ester) of diethyl (α-hydroxybenzyl)phosphonate.

13. The ethylene glycol phosphite (cyclic ester) of diethyl (2,4-dichloro-α-hydroxybenzyl)phosphonate.

14. The ethylene glycol phosphite (cyclic ester) of dimethyl (2-hydroxy-2-propyl)phosphonate.

15. The ethylene glycol phosphite (cyclic ester) of diethyl (2-hydroxyhexen-5-yl)phosphonate.

16. The 1,3-propanediol phosphite (cyclic ester) of diethyl (1-hydroxypropyl)phosphonate.

17. 2 - [1 - (ethoxybutylphosphinyl)propyloxy] - 4,5-benzo-1,3,2-dioxaphospholane.

18. 2 - [1 - (ethoxyphenylphosphinyl) - 2 - ethylhexyloxy]-1,3,2-dioxaphospholane.

No references cited.